Sept. 2, 1924.
W. H. BOT
WINDMILL
Filed May 24, 1923
1,506,968
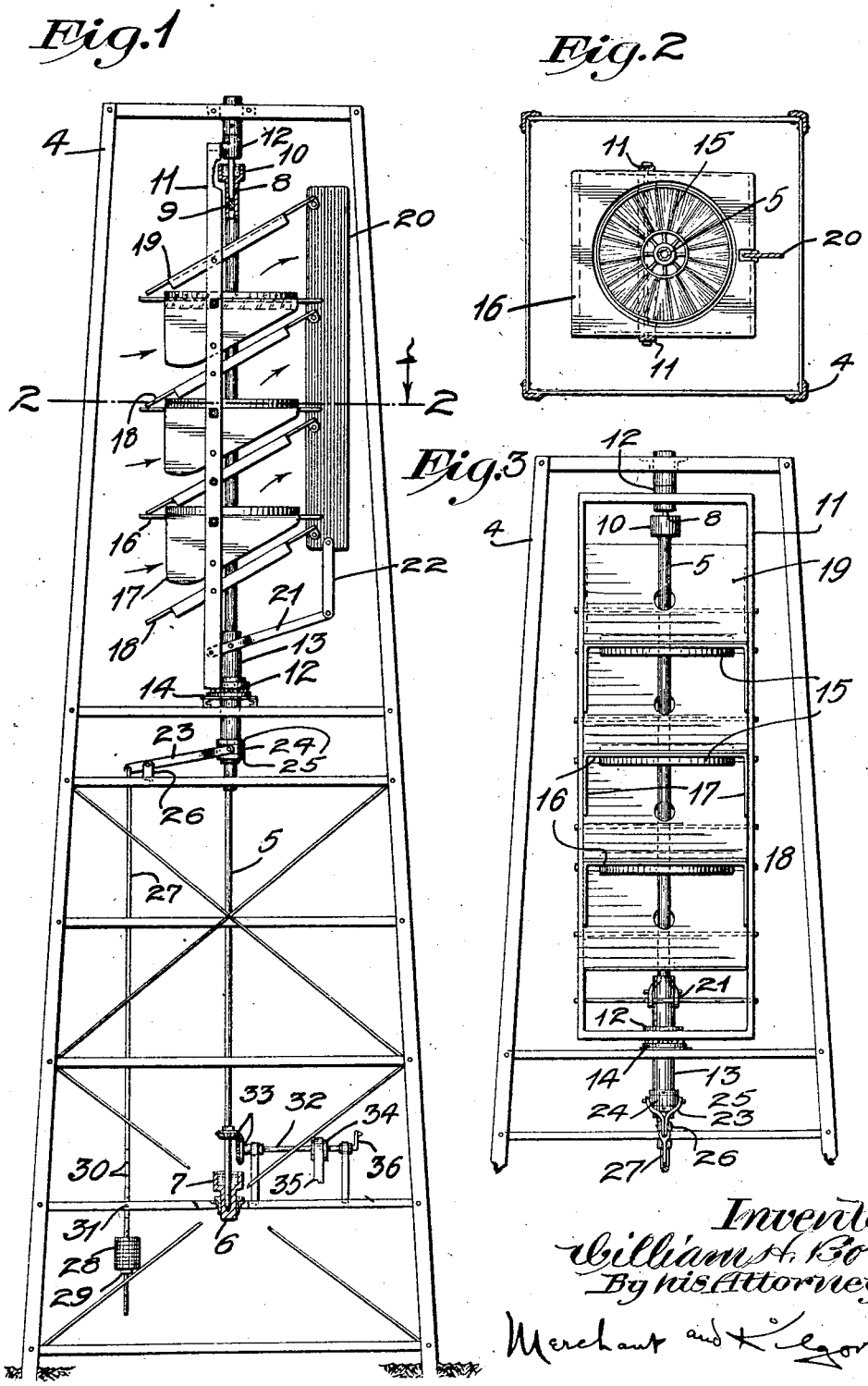

Patented Sept. 2, 1924.

1,506,968

UNITED STATES PATENT OFFICE.

WILLIAM H. BOT, OF GREEN VALLEY, MINNESOTA.

WINDMILL.

Application filed May 24, 1923. Serial No. 641,165.

*To all whom it may concern:*

Be it known that I, WILLIAM H. BOT, a citizen of the United States, residing at Green Valley, in the county of Lyon and State of Minnesota, have invented certain new and useful Improvements in Windmills; and I do hereby declare the following to be a full, clear, and exact description of the invention, such as will enable others skilled in the art to which it appertains to make and use the same.

My invention has for its object to provide a simple and highly efficient windmill, and to this end it consists of the novel devices and combinations of devices hereinafter described and defined in the claims.

In the accompanying drawings, which illustrate the invention, like characters indicate like parts throughout the several views.
Referring to the drawings:

Fig. 1 is a side elevation of the improved windmill;

Fig. 2 is a horizontal section taken on the line 2—2 of Fig. 1; and

Fig. 3 is a fragmentary front elevation of the improved windmill.

The numeral 4 indicates a tower, within which is an upright shaft 5 comprising rigidly connected upper and lower sections, the former of which is preferably tubular, and the latter of which is of smaller diameter. Said shaft 5 has a conical lower end journaled in a step bearing 6 carried by the tower 4 and cupped to afford an oil receptacle 7. A depending fixed spindle 8 having a conical lower end is carried by the top of the tower 4, extends within the shaft 5, and holds the same in an upright position. The conical end of the spindle 8 is mounted in a correspondingly formed bearing 9 within the shaft 5 to take lifting end thrusts. The shaft 5 above the bearing 9 is expanded to afford a cup-like oil receptacle 10.

A vertically disposed rectangular skeleton frame 11 is closely positioned to the shaft 5, at one side thereof, and is provided with laterally offset upper and lower bearings 12, the former of which is journaled on the spindle 8, and the latter of which is journaled on a bearing sleeve 13 and supported on a roller bearing 14 carried by the tower 4. The sleeve 13 is slidably mounted on the upper section of the shaft 5, and in which sleeve the shaft is free to rotate.

A plurality of vertically spaced horizontally disposed wind wheels 15 are secured to the upper section of the shaft 5 for rotation therewith and work within axial openings in rectangular horizontally disposed baffles 16 which extend within the frame 11, and are rigidly secured thereto. These baffles 16 are provided with depending side wings 17 rigidly secured to the side members of the frame 11. Below each wind wheel 15 is an upwardly and rearwardly inclined wind deflector 18 intermediately pivoted at its sides to the uprights of the frame 11. Above the uppermost wind wheel 15 is a wind deflector 19 which is like the deflector 18, and extends parallel thereto. The rear ends of the wind deflectors 18 and 19 are all pivotally connected for common movement to a vertically disposed vane 20 which extends radially rearward from the wind wheels 15. The deflectors 18 are arranged to direct wind upward through the wind wheels 15, and, together with the deflector 19, directs the wind from the wind wheels 15 horizontally toward the vane 20.

Normally, the deflectors 18 and 19 are set to cut off the wind and prevent the same from blowing over the wind wheels 15 and to direct substantially all of the wind upward through said wind wheels and then horizontally toward the vane 20 to hold the same out of the wind. To raise or lower the vane 20 and thereby angularly adjust the deflectors 18 and 19 and hold the same where set to regulate the amount of wind passing upward through the wheels 15, the following connections are provided, to wit: The prongs of the forked lever 21 are fulcrumed to the frame 11 and intermediately pivoted to the sleeve 13 which they embrace. The other end of the lever 21 is connected by a link 22 to the lower end of the vane 20. A shipper lever 23 is connected to a shipper collar 24 on the sleeve 13 and held between opposing shoulders 25. This shipper lever 23 is fulcrumed at 26 to the tower 4, and attached to its free end is a depending rod 27 which extends within easy reach from the ground. A plurality of weights 28 are mounted on the lower end of the rod 27 and supported on a nut 29 thereon. This weight 28 normally holds the sleeve 13 raised, which in turn holds the deflectors 18 and 19, by means of the vane 20, lever 21 and link 22, in normal position, as shown in Fig. 1. To hold the deflectors 18 and 19 partly open, the operating rod 27 is provided with a multiplicity of vertically spaced holes 30 through any one of which may be projected a pin 31 on the tower 4.

Different devices may be used for transmitting power from the shaft 5, as for instance, there is shown in the drawings a counter-shaft 32 connected to the shaft 5 by gears 33 and provided with a pulley 34 over which runs a belt 35, and also providing said counter-shaft with a crank 36 for actuating the connecting rod, not shown.

In case the wind is too severe, the pressure thereof on the deflectors 18 and 19 will overcome the governor weight 28 and open up said deflectors and permit part or all of the wind to pass over or under the wind wheels. As the wind decreases, the weight 28 will automatically return the deflectors to normal position. The wind acting on the vane 20 will hold the windmill into the wind.

From the above description it is evident that any number of wind wheels may be mounted on the driving shaft, and the mounting of the wind wheels to revolve in a horizontal plane eliminates a great many of the strains to which an ordinary windmill is subject. It is also evident that the windmill is extremely simple with few parts to get out of order, and the speed thereof may be automatically governed or the deflector set at any desired angle by lifting the rod 27 and securing the same by the pin 31.

What I claim is:

1. The combination with a horizontally disposed wind wheel, of a deflector arranged to deflect wind through the wind wheel, and automatic means for angularly adjusting the deflector in respect to the wind wheel.

2. The combination with a horizontally disposed wind wheel, of a deflector angularly adjustable in a vertical plane and arranged to deflect wind to the wind wheel.

3. The combination with a horizontally disposed wind wheel, of a vane, a deflector operatively connected to the vane and arranged to deflect wind through the wind wheel, and means operative on the vane to angularly adjust the deflector in respect to the wind wheel.

4. The combination with a horizontally disposed wind wheel, of an angularly adjustable deflector mounted to swing around the axis of the wind wheel and arranged to deflect wind through the wind wheel, and an upright vertically movable vane extending radially rearward from the wind wheel and mounted to swing with the deflector and movable to adjust the deflector in respect to the wind wheel.

5. The combination with a horizontally disposed wind wheel, of a deflector mounted to swing around the axis of the wind wheel and arranged to deflect wind through the wind wheel, a second deflector above the wind wheel and arranged to deflect wind toward the vane, and an upright vane extending radially rearward from the wind wheel and mounted to swing with the deflector.

6. The combination with a horizontally disposed wind wheel, of an angularly adjustable deflector mounted to swing around the axis of the wind wheel and arranged to deflect wind therethrough, and an upright vane extending radially rearward from the wind wheel and mounted to swing with the deflector.

7. The combination with a horizontally disposed wind wheel, of an angularly adjustable deflector mounted to swing around the axis of the wind wheel and arranged to deflect wind therethrough, an upright vane extending radially rearward from the wind wheel and mounted to swing with the deflector, and a governor tending to hold the deflector in normal position.

8. The combination with a horizontally disposed wind wheel, of an angularly adjustable deflector mounted to swing around the axis of the wind wheel and arranged to deflect wind therethrough, an upright vane extending radially rearward from the wind wheel and mounted to swing with the deflector, and a variably weighted governor tending to hold the deflector in normal position.

9. The combination with a horizontally disposed wind wheel, of an angularly adjustable deflector mounted to swing around the axis of the wind wheel and arranged to deflect wind therethrough, an upright vane extending radially rearward from the wind wheel and mounted to swing with the deflector, and means for positively securing the deflector in different angular adjustments.

10. The combination with a horizontally disposed wind wheel, of an angularly adjustable deflector mounted to swing around the axis of the wind wheel and arranged to deflect wind therethrough, an upright vane extending radially rearward from the wind wheel and mounted to swing with the deflector, and a horizontally disposed baffle surrounding the wind wheel.

11. The combination with a horizontally disposed wind wheel, of an angularly adjustable deflector mounted to swing around the axis of the wind wheel and arranged to deflect wind therethrough, an upright vane extending radially rearward from the wind wheel and mounted to swing with the deflector, a horizontally disposed baffle surrounding the wind wheel, and side wings between the baffle and the deflector.

12. The combination with an upright shaft, of a plurality of vertically spaced horizontally disposed wind wheels secured to the shaft, and angularly adjustable deflectors mounted to swing around the axis of the shaft and arranged to deflect wind through the wind wheels and connected for common angular adjustment.

13. The combination with an upright shaft, of a plurality of vertically spaced horizontally disposed wind wheels mounted on the shaft, a frame mounted to swing around the axis of the shaft, angularly adjustable deflectors mounted on said frame and arranged to direct wind through the wind wheels and connected for common angular adjustment, and a vertically disposed vane extending radially rearward from the wind wheel and carried by the frame.

14. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind through the wind wheels, an upright vane extending radially rearward from the wind wheel and to which vane the deflectors are connected for common angular adjustment, and means for raising and lowering the vane to angularly adjust the deflectors.

15. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind through the wind wheels, an upright vane extending radially rearward from the wind wheel and to which vane the deflectors are connected for common angular adjustment, means for raising and lowering the vane to angularly adjust the deflectors, and means for securing the vane to hold the deflectors in different angular adjustments.

16. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind through the wind wheels, an upright vane extending radially rearward from the wind wheel and to which vane the deflectors are connected for common angular adjustment, means for raising and lowering the vane to angularly adjust the deflectors, and side wings between the wind wheels and deflectors.

17. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind through the wind wheels, an upright vane extending radially rearward from the wind wheel and to which vane the deflectors are connected for common angular adjustment, means for raising and lowering the vane to angularly adjust the deflectors, and a baffle surrounding each wind wheel.

18. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind through the wind wheels, an upright vane extending radially rearward from the wind wheel and to which vane the deflectors are connected for common angular adjustment, means for raising and lowering the vane to angularly adjust the deflectors, a baffle surrounding each wind wheel, and side wings between the baffles and deflectors.

19. The combination with an upright shaft, of a plurality of vertically spaced horizontally disposed wind wheels mounted on the shaft, a frame mounted to swing around the axis of the shaft, deflectors mounted on said frame for angular adjustment in a vertical plane and arranged to direct wind upwardly through the wind wheels, an upright vane extending radially rearward from the wind wheel and to which vane the deflectors are connected for common angular adjustment, a sleeve slidable on the shaft and in which said shaft is free to rotate, operating connections from the sleeve to the vane, and operating means for sliding the sleeve on the shaft for raising and lowering the vane to simultaneously angularly adjust the deflectors.

20. The structure defined in claim 19 in which the operating means includes a variable weight-acting governor.

21. The structure defined in claim 19 in further combination with means for securing said operating means to hold the deflectors in different angular adjustments.

22. The structure defined in claim 19 in further combination with a deflector above the uppermost wind wheel for directing the wind passing therethrough toward the vane.

In testimony whereof I affix my signature.

WILLIAM H. BOT.